March 1, 1960 C. W. WOOD 2,926,853
DOUBLE VALVE THERMOSTAT
Filed March 26, 1956
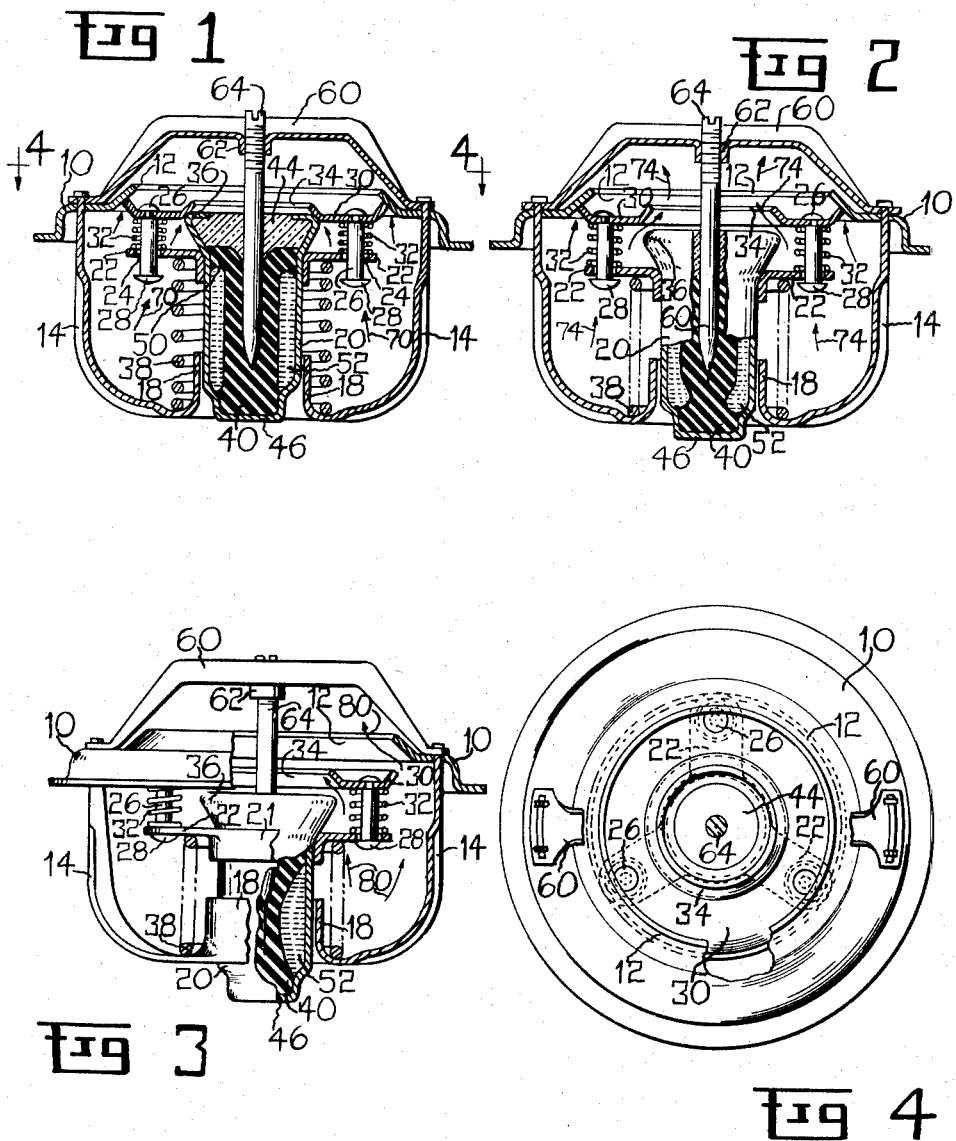
INVENTOR.
CHARLES W. WOOD
BY Dybvig and Jacox
HIS ATTORNEYS—

United States Patent Office 2,926,853
Patented Mar. 1, 1960

2,926,853

DOUBLE VALVE THERMOSTAT

Charles W. Wood, Lebanon, Ohio, assignor to Standard-Thomson Corporation, Dayton, Ohio, a corporation of Delaware Application March 26, 1956, Serial No. 573,734

4 Claims. (Cl. 236—34)

This invention relates to a valve. The invention relates more particularly to a thermal responsive fluid control valve. The invention relates more particularly to a thermostatic fluid control valve for the cooling system of an internal combustion engine; however, the invention is not so limited in that it may be applied to other types of fluid systems.

In a fluid system of an internal combustion engine it is desirable to have a thermal control valve which permits full fluid flow, if necessary, and which has means for accurate control of fluid flow. However, variations of pressure within a fluid system may sometimes change, to some extent, the movement of a movable valve member which has sufficient area to close a large fluid port.

Hence it is an object of this invention to provide a fluid control valve which has means for permitting full fluid flow while also having means for closely controlling fluid flow.

It is another object of this invention to provide a fluid control valve, the operation of which is substantially the same under low fluid pressure conditions as under high fluid pressure conditions.

Another object of this invention is to provide a thermal responsive valve having rapid temperature response characteristics.

Other objects and advantages reside in the construction of parts, the combination thereof and the mode of operation, as will become more apparent from the following description.

In the drawing,

Figure 1 is a side sectional view of a valve of this invention. Figure 1 shows the valve elements closed to fluid flow.

Figure 2 is a sectional view somewhat similar to the view of Figure 1. Figure 2 shows elements of the valve in operating positions.

Figure 3 is a side elevational view with parts broken away. Figure 3 also shows elements of the valve in operating positions.

Figure 4 is a section view taken substantially on line 4—4 of Figure 1.

Referring to the drawing in detail, the valve of this invention comprises an annular body member 10 provided with an inwardly extending angular flange member 12 serving as a valve seat member and forming a flow passage therethrough. Attached to the annular body member 10 and extending in an axial direction therefrom are a plurality of legs 14 having a guide sleeve 18 at the ends thereof.

Axially movable within the guide sleeve 18 is a container or casing member 20. The casing member 20 has rigidly attached thereto a ring 21 having a plurality of laterally extending support arm members 22. Each of the support arms 22 is provided with an aperture 24 adjacent the end thereof. Slidably positioned within each aperture 24 is a pin member 26. Each pin member 26 is disposed normal to its respective support arm 22. Each pin member 26 is provided with a head 28 at one end thereof. The other end of each pin 26 is rigidly attached to a movable valve member 30. The movable valve member 30 is adapted to engage the flange 12 for closing the fluid port therethrough.

Encircling each pin member 26 intermediate the movable valve member 30 and the arm 22 which supports the pin 26 is a helical spring member 32. The helical spring member 32 urges the movable valve member 30 in a direction from the arms 22.

The movable valve member 30 is provided with a central opening having tapered edge portions 34. The end of the casing or container 20 which is adjacent the tapered edge portions 34 of the movable valve member 30 is provided with a flared end portion 36 for engagement with the tapered edge portions 34 for closing the opening at the central portion of the movable valve member 30. The flared end portion 36 of the container 20 thus serves as an auxiliary closure member.

Encircling the casing or container member 20 and the guide sleeve 18 is a helical spring member 38. The helical spring member 38 is resiliently disposed intermediate the legs 14 and the arms 22 and urges the container member 20 toward the fluid port formed by the flange 12.

The casing member 20 may comprise any suitable thermal responsive member. However, herein the casing member 20 contains a cylindrical elastic body 40 which extends between a cover plate 44, disposed at the flared end of the casing member 20, and a bottom end wall 46 of the casing member 20. The end of the cylindrical elastic body 40 adjacent the cover plate 44 is provided with a flange 50 which aids in sealing a thermal responsive expansible-contractible material 52 within the container 20. The container member 20 with the contents thereof may be similar to the container and contents thereof disclosed in my co-pending application Serial No. 333,707 filed on or about January 28, 1953, now Patent No. 2,806,375.

Also attached to the annular body member 10 and extending axially therefrom in a direction opposite the legs 14 is a bridge member 60 which is provided with a threaded receptacle 62 at the central portion thereof. The receptacle 62 retains a rod member 64 which is threadedly disposed within the receptacle 62 and extends into the container 20 through the cover plate 44 thereof and into the elastic cylinder 40. The elastic cylinder 40 has an elongate cavity therein extending a portion of the length thereof within which the rod member 64 is partially disclosed.

For purposes of illustration, fluid is assumed to be disposed at the lower part of the valve with fluid pressure exerted as shown by arrows 70 in Figure 1.

When the temperature of the valve assembly of this invention is below the operating temperature, the elements of the assembly are as shown in Figure 1. Under such conditions, the movable valve member 30 is in engagement with the flange 12 closing the fluid port formed by the flange 12. Also, the flared end 36 of the container 20 is in engagement with the tapered edge portions 34 of the opening in the movable valve member 30. Thus, the flow passage formed by the flange member 12 and the fluid port formed in the movable valve member 30 are both closed.

However, upon slight increase in temperature of the fluid which surrounds the container or casing member 20, the thermal expansive material 52 within the container 20 receives heat and increases in volume, as shown in Figure 2. This increase in volume of the expansive material 52 within the container 20 results in inward movement of the walls of the cavity of the elastic body 40, as shown in Figure 2. This inward movement of the walls of the cavity of the elastic body 40 causes a squeezing or extrusion action upon the rod member 64.

Due to the fact that the rod member 64 is rigidly and firmly attached to the bridge member 60, the rod member 64 cannot move with respect to the annular body member 10. However, due to the fact that the container member 20 is movable within the guide sleeve 18, the container member 20 is forced to move upon expansion of the expansive material 52 therewithin. The container member 20 thus moves from engagement with the tapered portions 34 of the movable valve member 30, thus opening the flow passage formed by the tapered portions 34. Therefore, fluid is permitted to pass through the opening at the central portion of the movable valve member 30, as shown by arrows 74 in Figure 2. However, as shown in Figure 2, due to the fact that the container member 20 has moved only a slight distance, the movable valve member 30 remains in engagement with the flange 12. It is thus understood that upon slight movement of the container 20 fluid flow is restricted to the central opening in the movable valve member 30.

When the temperature of the fluid surrounding the container member 20 reaches a higher value, the container member 20 is forced to move farther, guided by the guide sleeve 18. The arms 22 thus engage the heads 28 of the pins 26 moving the movable valve member 30 from engagement with the angular flange 12. Thus, flow of fluid is permitted through the flow passage formed by the flange 12 as well as through the flow passage at the center of the movable valve member 30, as shown by arrows 80 in Figure 3.

It is naturally understood that movement of the container member 20 is against the pressure exerted by the spring member 38. Thus, as the temperature of the fluid which engages the container member 20 decreases, the volume of the thermal expansive material 52 within the container 20 decreases, permitting the spring member 38 to move the container member 20 in a direction toward the bridge 60. If the temperature of the fluid surrounding the container or casing member 20 reaches a sufficiently low value, the movable member 30 again engages the flange 12 closing the fluid port therethrough, as shown in Figure 2. If the temperature of the fluid decreases further, the container member 20 is moved further by the spring 38 so that the flared end portion 36 of the container member 20 re-engages the tapered portions 34, closing the opening in the central portion of the movable valve member 30, as shown in Figure 1.

Thus, it is understood that by means of a valve of this invention either a large or small volume of fluid flow may be closely and accurately controlled.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A double valve thermostatic device of the type provided with an annular body member, the body member having a flange portion forming a valve seat having a flow passage therethrough, a pair of leg members extending in an axial direction from the annular body member at one side thereof, a guide member attached to the leg members and disposed in spaced relation from the body member, the combination comprising a completely rigid container bodily movable with respect to the guide member and guided thereby, the container having a flared end portion, a plurality of arm members attached to the container and extending laterally therefrom, a closure member engageable with the flange portion for closing the flow passage therethrough, the closure member being resiliently carried by the arm members, the closure member having an opening therein in alignment with the container, the opening having a tapered edge portion, the flared end portion of the container being engageable with the tapered edge portion to close the opening, resilient means urging the container toward the valve seat, support structure extending from the body member in the direction opposite the guide member, a rod rigidly attached to the support structure and extending through the body member and into the container, the container being provided with a thermal responsive force transmitting material.

2. A double valve thermostatic device of the type provided with a body member, the body member having a portion forming a valve seat having a flow passage therethrough, first support means, the first support means extending from the body member at one side thereof, a guide member attached to the support means and disposed in spaced relation from the body member, the combination comprising a rigid container bodily movable with respect to the guide member and guided thereby, the container having an abutment end portion, support structure firmly attached to the container and extending laterally therefrom, a closure member engageable with the valve seat of the body member for closing the flow passage therethrough, the closure member being resiliently carried by the support structure, the closure member having an opening therein in alignment with the container, the opening having an edge portion, the abutment end portion of the container being engageable with the edge portion of the container to close the opening, resilient means urging the container toward the valve seat, second support means, the second support means being attached to the body member and extending therefrom in a direction opposite the first support means, a rod rigidly attached to the second support means and extending through the flow passage of the body member and into the container, and thermal responsive force transmission material within the container.

3. A double valve thermostatic device of the type provided with a body member, the body member having a valve seat with a flow passage therethrough, support means attached to the body member and extending therefrom, the combination comprising a rigid container bodily movable with respect to the support means, the container having an abutment portion, support structure attached to the container and extending therefrom, a closure member engageable with the valve seat for closing the flow passage therethrough, the closure member being resiliently carried by the support structure, the closure member having an opening therethrough in alignment with the container, the opening having an edge seat portion, the abutment portion of the container being engageable with the edge seat portion of the closure member to close said opening, resilient means urging the container toward the valve seat, a rod rigidly attached to the support means and extending through the flow passage of the body member and into the container, and thermal responsive force transmitting material within the container.

4. A double valve thermostatic device of the type provided with a body member, the body member having a valve seat with a flow passage therethrough, first support means, the first support means being attached to the body member and extending therefrom, guide means attached to the first support means in spaced relation from the body member, the combination comprising a rigid container bodily movable with respect to the guide means and guided thereby, the container having an abutment portion, support structure attached to the container and extending therefrom, a closure member engageable with the valve seat for closing the flow passage therethrough, the closure member being resiliently carried by the support structure, the closure member having an opening therethrough in alignment with the container, the opening having an edge seat portion, the abutment portion of the container being engageable with the edge seat portion of the closure member to close said opening, resilient means urging the container toward the valve seat, second support means, the second support means extending from the body member in a direction opposite the guide means, a rod rigidly attached to the second support means and extending through the flow passage of the body member and into the container, and thermal responsive force transmitting material within the container.

References Cited in the file of this patent
UNITED STATES PATENTS

| | | | |
|---|---|---|---|
| 39,772 | Hoard et al. | Sept. 1, | 1863 |
| 2,137,136 | Giesler | Nov. 15, | 1938 |
| 2,174,042 | Rose | Sept. 26, | 1939 |
| 2,356,958 | Wangenheim | Aug. 29, | 1949 |
| 2,628,781 | Cantalupo | Feb. 17, | 1953 |

UNITED STATES PATENT OFFICE

CERTIFICATE OF CORRECTION

Patent No. 2,926,853                  March 1, 1960

Charles W. Wood

It is hereby certified that error appears in the printed specification of the above numbered patent requiring correction and that the said Letters Patent should read as corrected below.

Column 4, line 32, for "container" read -- opening --.

Signed and sealed this 13th day of September 1960.

(SEAL)
Attest:
KARL H. AXLINE
Attesting Officer

ROBERT C. WATSON
Commissioner of Patents